(12) United States Patent
Kitamura et al.

(10) Patent No.: US 7,596,085 B2
(45) Date of Patent: Sep. 29, 2009

(54) ACCESS NETWORK SYSTEM AND METHOD OF MOVING INTERNAL NETWORK RELAY DEVICES

(75) Inventors: Tsutomu Kitamura, Minato-ku (JP); Takayuki Shizuno, Minato-ku (JP)

(73) Assignee: NEC Corporation, Tokyo (JP)

( * ) Notice: Subject to any disclaimer, the term of this patent is extended or adjusted under 35 U.S.C. 154(b) by 618 days.

(21) Appl. No.: 11/294,522

(22) Filed: Dec. 6, 2005

(65) Prior Publication Data

US 2006/0120346 A1 Jun. 8, 2006

(30) Foreign Application Priority Data

Dec. 6, 2004 (JP) ............... 2004-353054

(51) Int. Cl.
*G01R 31/08* (2006.01)
*H04L 12/28* (2006.01)

(52) U.S. Cl. ............... 370/229; 370/254; 370/389; 370/395.21; 370/401

(58) Field of Classification Search ............... None
See application file for complete search history.

(56) References Cited

U.S. PATENT DOCUMENTS

| 6,914,886 | B2 * | 7/2005 | Peles et al. ............... 370/254 |
| 7,114,008 | B2 * | 9/2006 | Jungck et al. ............... 709/246 |
| 2002/0147800 | A1 * | 10/2002 | Gai et al. ............... 709/221 |
| 2002/0163884 | A1 * | 11/2002 | Peles et al. ............... 370/229 |
| 2003/0162499 | A1 * | 8/2003 | Jonsson ............... 455/41 |
| 2003/0174653 | A1 * | 9/2003 | Basu et al. ............... 370/238 |
| 2004/0071164 | A1 * | 4/2004 | Baum ............... 370/469 |
| 2005/0083936 | A1 * | 4/2005 | Ma ............... 370/392 |
| 2005/0089015 | A1 * | 4/2005 | Tsuge et al. ............... 370/351 |
| 2006/0120288 | A1 * | 6/2006 | Vasseur et al. ............... 370/235 |

FOREIGN PATENT DOCUMENTS

JP    1-122230 A    5/1989

(Continued)

OTHER PUBLICATIONS

LAN MAN Standards Committee of the IEEE Computer Society, "Information Technology—Telecommunications and Information Exchange Between Systems—Local and Metropolitan Area Networks—Common Specifications—Part 3: Media Access Control (MAC) Bridges," ISO/IEC, 1998 Edition.

(Continued)

*Primary Examiner*—Huy D. Vu
*Assistant Examiner*—Brandon Renner
(74) *Attorney, Agent, or Firm*—Sughrue Mion, PLLC

(57) ABSTRACT

An external network relay device measures group movement parameters that are used to determine whether the need exists to change the group affiliation of internal network relay devices. When the results of measuring the group movement parameters meet conditions that have been set in advance, the external network relay device transmits group movement notification messages instructing group movement to the internal network relay devices of its own group and causes the internal network relay devices to change to other groups.

20 Claims, 7 Drawing Sheets

FOREIGN PATENT DOCUMENTS

| | | |
|---|---|---|
| JP | 7-170279 A | 7/1995 |
| JP | 2000-32028 A | 1/2000 |
| JP | 2003-23444 A | 1/2003 |
| JP | 2003-46539 A | 2/2003 |
| JP | 2004-179880 A | 6/2004 |
| KR | 2002-0043154 A | 6/2002 |
| KR | 10-2004-0093148 A | 11/2004 |

OTHER PUBLICATIONS

The Institute of Electrical and Electronics Engineers, "Part 3: Media Access Control (MAC Bridges—Amendment 2: Rapid Reconfiguration," ISO/IEC, 2001.

The Institute of Electrical and Electronics Engineers, "Virtual Bridged Local Area Networks—Amendment 3: Multiple Spanning Trees," ISO/IEC, 2002.

* cited by examiner

ACCESS NETWORK SYSTEM AND METHOD OF MOVING INTERNAL NETWORK RELAY DEVICES

BACKGROUND OF THE INVENTION

1. Field of the Invention

The present invention relates to an access network system that is provided with a plurality of external network relay devices, which are relay devices for connecting with other networks, and a plurality of internal network relay devices for relaying information that is transmitted and received within a network, and to a method of moving internal network relay devices for causing said internal network relay devices to change groups of affiliation in an access network system.

2. Description of the Related Art

Normally, a network such as an LAN (Local Area Network) in a business organization is configured by connecting together in tree form a plurality of internal network relay devices (such as layer-2 switches and hubs, or computers) for relaying information (such as frames or packets) that is transmitted and received between end systems such as personal computers. The occurrence of a problem in any internal network relay device in such a configuration presents a serious problem that can bring business operations to a halt because communication with server devices that are within the same network is disrupted.

As one example for avoiding such problems, redundant communication paths are formed such that an internal network relay device in which a problem has occurred can be bypassed. However, providing communication paths as a redundant configuration raises the potential for the formation of loops and the consequent inability to realize normal communication.

A control method referred to as a spanning tree is prescribed in IEEE 802.1D for preventing the perpetual circulation of frames within a network. In this method, control information known as Bridge Protocol Data Units (BPDU) is exchanged between internal network relay devices, and a topology in a logical tree shape is formed that prevents the logical use of portions of a network that form physical loops.

In addition, a control method known as a high-speed spanning tree is prescribed in IEEE 802.1w in which the method of exchanging control information is expanded to accelerate the creation of the spanning tree prescribed in the above-described IEEE 802.1D, and further, a detour path is set in advance for the rapid securing of a detour path in the event of a problem.

A method referred to as PVST (Per VLAN Spanning Tree) also exists in which a plurality of VLAN (Virtual LAN) are formed using internal network devices that conform to the standards of IEEE 802.1Q, and in which independent spanning trees are formed for each VLAN, whereby the load of the network is distributed by the appropriate use of separate communication paths.

When the spanning tree topology is independent for each VLAN as in PVST, the spanning trees that are managed increase with increase in the number of VLAN, and this situation leads to an increase in processing for the spanning trees and a huge processing load for the CPU that is provided in the internal network relay devices. To compensate for this drawback and further, for mapping any VLAN to a plurality of topologies that have been created in advance, a control method known as a multiple spanning tree is prescribed in IEEE 802.1s. This method is here referred to as the first example of the prior art. The first example of the prior art avoids loop structures that are caused by redundancy of communication paths, and further, realizes static load distribution for each VLAN.

Networks are connected so as to allow communication with other networks by way of external network relay devices (such as routers, layer-3 switches, or computers), which are relay devices for connecting to other networks. The occurrence of a problem in an external network relay device in such a configuration disrupts communication with, for example, the server devices of other networks, resulting in serious problems such as the halt of business operations.

In one example for avoiding this type of problem, a plurality of external network relay devices may be established, but in an end system such as a personal computer that lacks a dynamic path switching capability, a gateway (an external network relay device) is statically designated as a default, and a problem that occurs at the gateway is therefore impossible to handle.

In response, technologies have been proposed and realized for improving system reliability by using a plurality of routers to construct a virtual router, and then switching the routers that carry out routing in the virtual router when a problem occurs. As an example of this technology, a technology known as VRRP (Virtual Router Redundant Protocol) has been standardized by IETF (The Internet Engineering Task Force), which is an international Internet organization.

In the above-described virtual router, the plurality of routers operates by dividing between a master router that actually performs routing and a backup router that carries on processing when a problem occurs in the master router. When a problem occurs in the master router or in a path within the monitor area of the master router, the backup router executes processing in place of the master router and continues communication. This processing raises the reliability of the system. However, in the virtual router, the backup router is always in an active state of transmitting and receiving packets to verify whether a problem has occurred in the master router. However, since the backup router does not normally perform routing, full advantage is not taken of the routing capability that is provided in the devices.

In VRRP that is standardized by the above-described IETF, static load distribution is realized by forming a plurality of groups. However, no consideration is given to the dynamic load state of each router in this method, and cases may occur in which load is concentrated in only a specific router and load cannot be distributed.

To deal with such a state, a system has been proposed in, for example, Japanese laid-open patent publication No. 2003-23444, for realizing dynamic load distribution by setting conditions such that, depending on the processing load such as the amount of flow of packets, the master router makes backup routers route packets, and entrusts backup routers with the routing of a portion of packets. This system is here referred to as the second example of the prior art.

In the above-described first example of the prior art, static load distribution was realized by mapping any VLAN to a plurality of trees. However, the load of a network is constantly fluctuating, and there is the consequent problem that the traffic of a network cannot be maximized by static load distribution alone.

In addition, in the first example of the prior art, a communication path is not switched until an internal network relay devices becomes completely incapable of communication, and as a result, load may concentrate in a particular internal network relay device without switching to another communication path despite the concentration of traffic in the specific internal network relay device and the drastic reduction in processing efficiency.

In the second example of the prior art, in contrast, time is required for adjustments between routers when switching routers that are to carry out routing in order to prevent simultaneous routing by a plurality of routers and consequent packet loss. Accordingly, routers cannot be switched in a short time, and a particular router may therefore be subjected to a high-load state for a lengthy time interval. A router that is subjected to a high-load state for a long time not only suffers a reduction of processing capabilities but also runs a higher risk for the occurrence of a problem, whereby the reliability of the overall network drops.

SUMMARY OF THE INVENTION

It is an object of the present invention to provide an access network system that enables an increase in the amount of network traffic and an improvement the reliability of a network, and to provide a method of moving internal network relay devices for causing said internal network relay devices to change groups of affiliation in an access network system.

In the present invention for achieving the above-described objects, external network relay devices measure group movement parameters that are used in determining the necessity for changing the groups to which internal network relay devices belong. When the measurement results of the group movement parameters meet preset conditions, an external network relay device transmits group movement notification messages instructing the change of groups to the internal network relay devices of its own group, and causes the internal network relay devices to change to other groups.

In this way, internal network relay devices can be dynamically changed to other groups in accordance with the value of group movement parameters that have been determined in advance. Thus, if, for example, the processing load of an external network relay device is taken as the group movement parameter, the internal network relay devices of its own group can, depending on the processing load of the external network relay device, be changed to the groups of another external network relay device having a lighter load.

Accordingly, the processing load can be distributed dynamically among a plurality of external network relay devices and the amount of traffic of the entire network can be increased. In addition, the ability to lighten processing load before a problem occurs in an external network relay device can reduce the rate of incidence of problems and thus improve the reliability of the network.

DETAILED DESCRIPTION OF THE PREFERRED EMBODIMENTS

Figure 1:
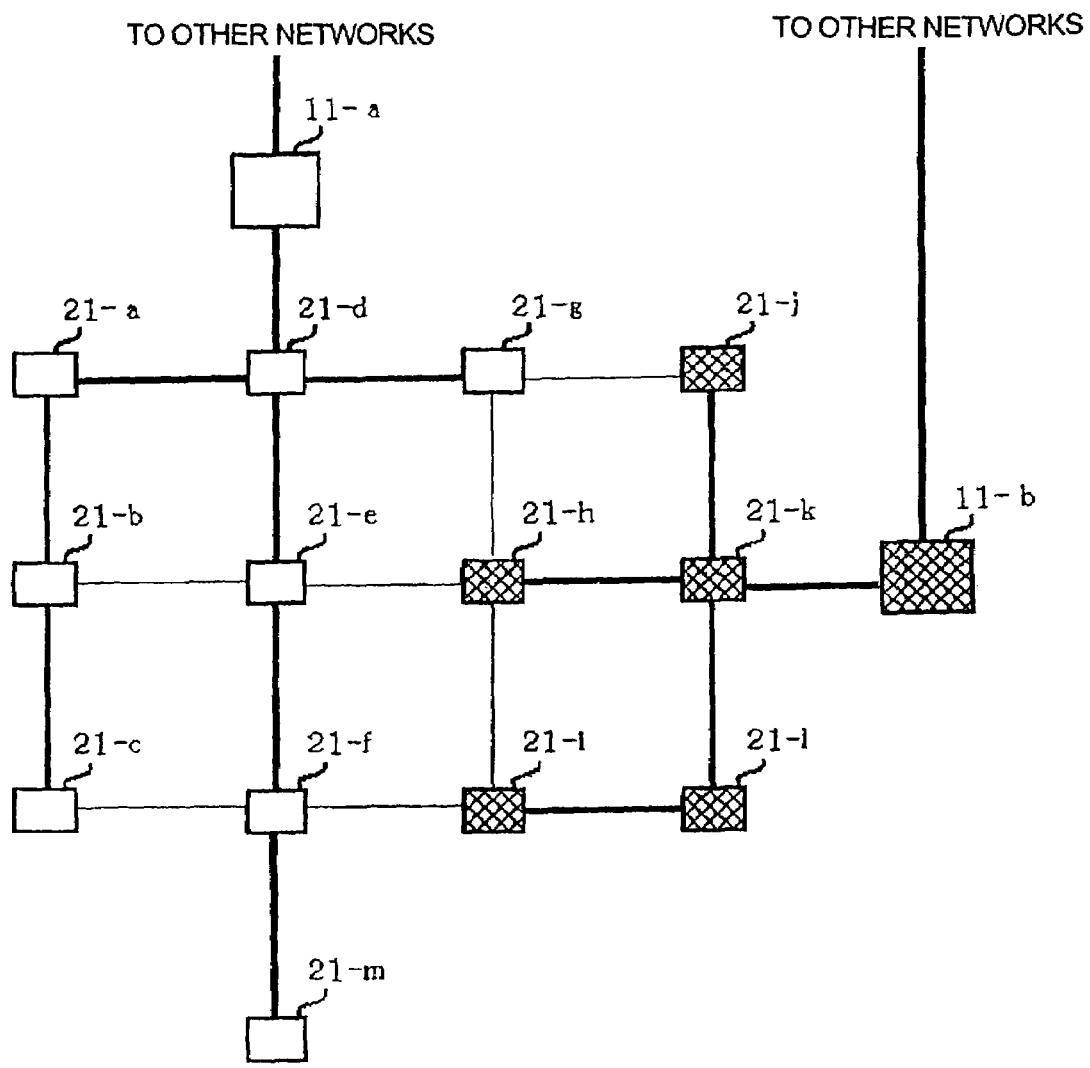
FIG. 1 is a block diagram showing an example of the configuration of an access network system.

FIG. 1 is a block diagram showing an example of the configuration of an access network system.

Figure 2:
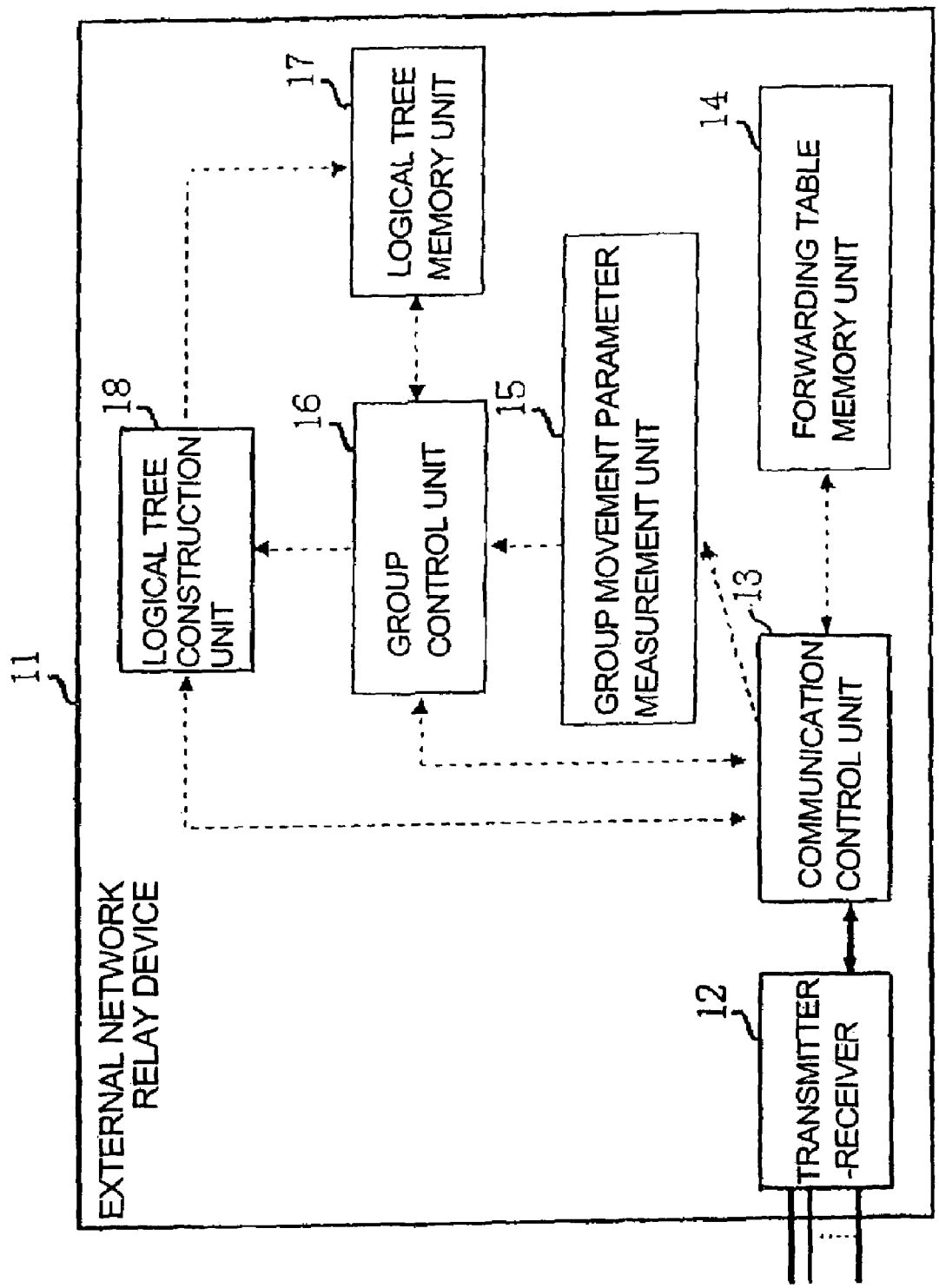
FIG. 2 is a block diagram showing an example of the configuration of the external network relay device that is shown in FIG. 1.
Figure 3:
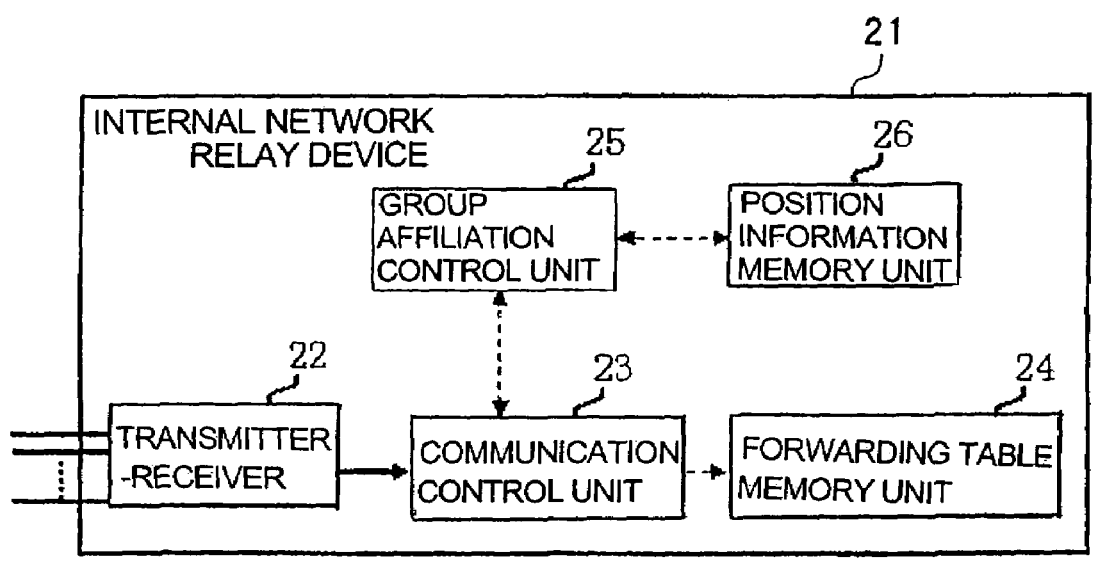
FIG. 3 is a block diagram showing an example of the configuration of the internal network relay device that is shown in FIG. 1.

FIG. 2 is a block diagram showing an example of the configuration of the external network relay device that is shown in FIG. 1, and FIG. 3 is a block diagram showing an example of the configuration of the internal network relay device that is shown in FIG. 1.

As shown in FIG. 1, an access network system is of a configuration having: a plurality (two in the example shown in FIG. 1) of external network relay devices 11-*a* and 11-*b*, which are relay devices for connecting to other networks; and a plurality (13 in the example that is shown in FIG. 1) of internal network relay devices 21-*a*-21-*m* connected in a matrix, these relay devices being relay devices for relaying frames that are transmitted and received within a network. In the following explanation, reference numeral 11 is used to indicate any external network relay device, and reference numeral 21 is used to indicate any internal network relay device.

Internal network relay devices 21 belong to any of groups that have been set to correspond to a plurality of external network relay devices 11, and communicate with other networks by way of the external network relay devices 11 of the affiliated group.

As shown in FIG. 2, external network relay device 11 is of a configuration that includes: logical tree construction unit 18 that uses internal network relay devices 21 to construct a logical tree; logical tree memory unit 17 for recording logical trees that have been constructed by logical tree construction unit 18; group movement parameter measurement unit 15 for measuring the group movement parameters that are used in the determination of the need to change the groups to which internal network relay devices 21 belong; group control unit 16 for managing internal network relay devices 21 that belong to a group; communication control unit 13 for generating forwarding tables for forwarding frames and for transmitting and receiving frames in accordance with these forwarding tables; forwarding table memory unit 14 for storing forwarding tables; and transmitter-receiver 12 for physically transmitting and receiving data.

As shown in FIG. 3, internal network relay device 21 is of a configuration that includes: group affiliation control unit 25 for determining and altering the group to which internal network relay device 21 belongs; position information memory unit 26 for storing position information of its own device in the logical tree; forwarding table memory unit 24 for storing a plurality of forwarding tables that correspond to each external network relay device; communication control unit 23 for generating forwarding tables and for transmitting and receiving frames or packets in accordance with the forwarding tables; and transmitter-receiver 22 for physically transmitting and receiving data.

Each of the constituent elements that are provided in external network relay device 11 and internal network relay device 21 that are shown in FIG. 2 and FIG. 3 may be realized by dedicated circuits composed of, for example, LSI or logic circuits.

Alternatively, each of the constituent elements that are provided in external network relay device 11 and internal network relay device 21 may be realized by a computer that is provided with DSP, CPU, memory such as RAM and ROM, a memory medium in which programs are recorded, and other LSI (for example, bus controllers or I/O controllers). In such cases, the operations of external network relay device 11 and internal network relay device 21 that are described hereinbelow are realized by the execution of prescribed processes by CPU and DSP in accordance with programs that are recorded in the memory medium.

Figure 4:
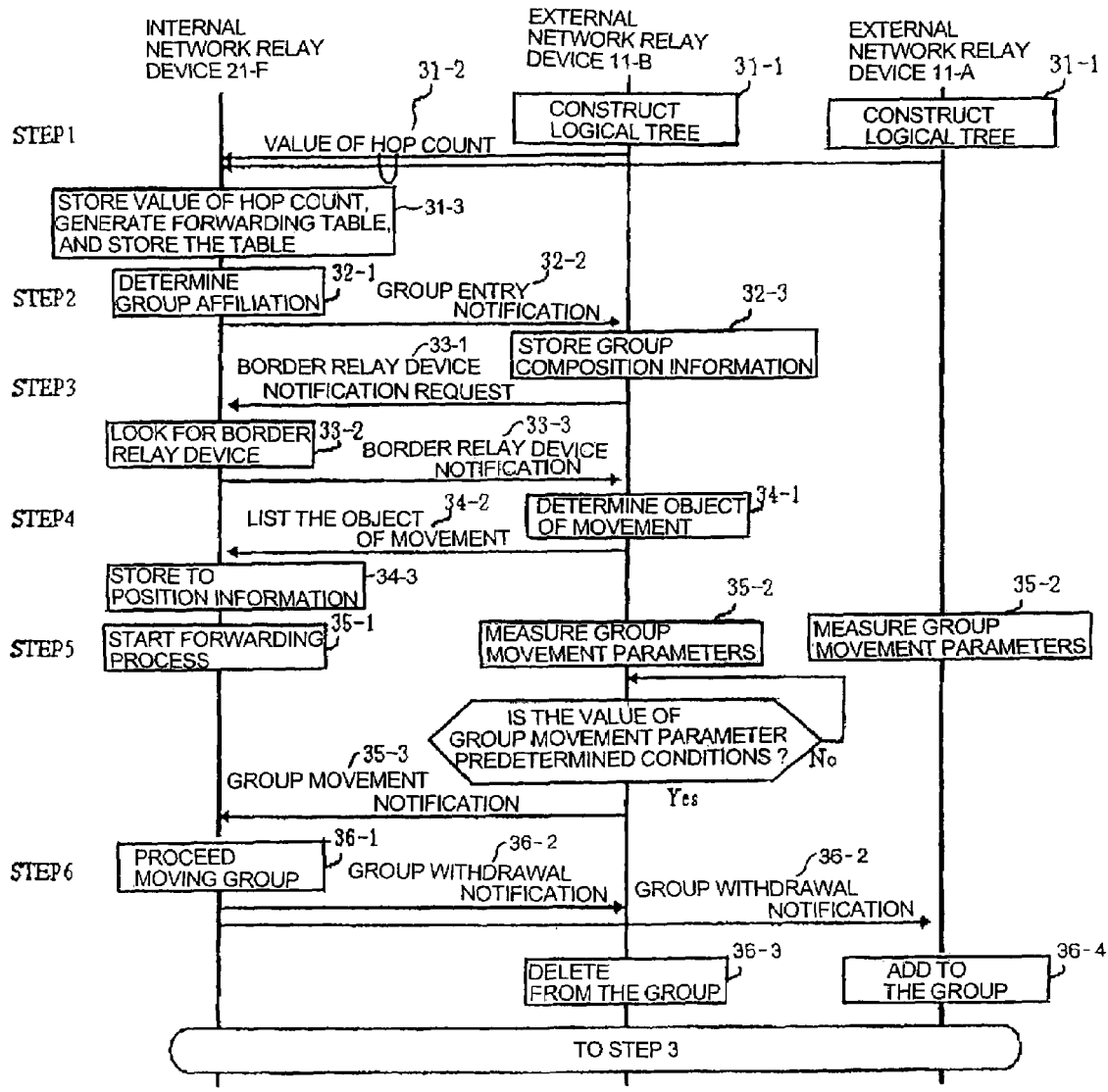
FIG. 4 is a sequence chart showing the procedure of the access network system of the present invention.

The following explanation regards the operations of the access network system of the present invention with reference to FIG. 4.

FIG. 4 is a sequence chart showing the procedures in the access network system of the present invention. FIG. 4 shows an example of processing for a case in which internal network relay device 21-$f$ that is shown in FIG. 1 changes from the group of external network relay device 11-$a$ to the group of external network relay device 11-$b$. The following explanation shows processing that is common to each external network relay device 11 unless particularly specified. In addition, the explanation also shows processing that is common to each internal network relay device 21.

[Step 1]: Logical tree construction unit 18 in each external network relay device 11 first constructs a logical tree that takes as objects all internal network relay devices 21 within the network. The logical tree is constructed such that loops do not occur within the network (processing step 31-1). The construction of logical trees uses spanning trees that conform to, for example, the above-described IEEE 802.1D.

In a spanning tree, external network relay devices 11 are always used as route switches, and, by taking the hop count as the cost value, the logical tree is constructed so as to minimize the depth (hop count) to each internal network relay device 21 from external network relay device 11. The logical tree that is constructed by logical tree construction unit 18 is stored in logical tree memory unit 17.

External network relay devices 11 report to each internal network relay device 21 the hop count from internal network relay device 21 to that external network relay device according to the logical tree that has been constructed (processing step 31-2).

Internal network relay devices 21 store in respective position information memory units 26 the addresses of external network relay devices 11 and the hop counts to external network relay devices 11 that are reported from each external network relay device 11. In addition, communication control unit 23 generates forwarding tables for each external network relay device 11. The plurality of forwarding tables that is generated are each stored to forwarding table memory unit 24 (processing step 31-3).

[Step 2] Internal network relay devices 21 next use group affiliation control unit 25 to compare the hop counts to each external network relay device 11 that are stored in position information memory unit 26 and determine external network relay device 11 for which the hop count is a minimum to be external network relay device 11 to which that device belongs (processing step 32-1). Group affiliation control unit 25 further notifies communication control unit 23 to use the forwarding table that corresponds to the group to which it belongs. Group affiliation control unit 25 further transmits a group entry notification message to external network relay device 11 to which affiliation has been determined (processing step 32-2).

External network relay device 11 that has received the group entry notification message uses group control unit 16 to store group composition information that indicates which internal network relay devices 21 belong to the group of that external network relay device in logical tree memory unit 17 (processing step 32-3). In the example shown in FIG. 1, two groups (the group including 21-$a$-$g$ and 21-$m$, and the group including 21-$h$-$l$) are formed from the thirteen internal network relay devices 21-$a$-$m$ as shown by the heavier lines in the figure.

[Step 3] External network relay device 11 next transmits border relay device notification request messages to all internal network relay devices 21 that belong to its own group (processing step 33-1).

Each internal network relay devices 21 that receives the border relay device notification request message uses group affiliation control unit 25 to determine whether its own device is a border relay device that is adjacent to internal network relay device 21 of another group (processing step 33-2). Group affiliation control unit 25 submits inquiries regarding group affiliation to adjacent internal network relay devices 21 and external network relay devices 11, and if even one adjacent internal network relay device 21 belongs to a different group, determines that its own device is a border relay device. In the example shown in FIG. 1, internal network relay devices 21-$e$, 21-$f$, 21-$g$, 21-$h$, 21-$i$, and 21-$j$ are border relay devices.

Group affiliation control unit 25 that has determined that its own device is a border relay device transmits a border relay device notification message to external network relay device 11 with which it is affiliated (process step 33-3).

[Step 4] External network relay devices 11 that receive the border relay device notification messages use group control unit 16 to refer to the logical tree information that has been stored in logical tree memory unit 17 and determine the relay devices of the plurality of border relay devices that are to be the objects of movement, these being internal network relay devices 21 that are the objects of movement that are to be changed to other groups [processing step 34-1].

In this case, of the border relay devices within its own group, border relay devices that do not have another border relay device downstream and internal network relay devices 21 that are connected downstream of these border relay devices are taken as the relay devices that are the objects of movement. In FIG. 1, internal network relay devices 21-$f$, 21-$m$, and 21-$g$ are the relay devices that are the objects of movement.

Group control unit 16 further generates a list of relay devices that are the objects of movement to manage the relay devices that are the objects of movement within its own group, and reports this list of relay devices that are the objects of movement to internal network relay devices 21 within its own group (processing step 34-2).

Internal network relay devices 21 that have received this list of relay devices that are the objects of movement each use group affiliation control unit 25 to store to position information memory unit 26 information indicating whether its own device is a relay device that is the object of movement (processing step 34-3).

[Step 5] After completing the above-described process, each internal network relay device 21 uses respective communication control unit 23 and begins the process of forwarding frames that are the objects of transmission or reception while referring to the forwarding table that was selected in Step 2 (processing step 35-1).

On the other hand, external network relay devices 11 begin measurement of the group movement parameters that have been set in advance in group movement parameter measurement unit 15 (processing step 35-2). Group movement parameters include, for example: the processing load of external network relay devices 11; the frequency of use of the resources (for example, memory) belonging to external network relay devices 11; the amount of frame forwarding; and the frame transfer delay time.

When the values of the group movement parameters that have been measured by group movement parameter measurement unit 15 meet predetermined conditions, external network relay device 11 transmits a group movement notification message instructing the change of groups to all internal network relay devices 21 that belong to its own group (processing step 35-3).

[Step 6] Each internal network relay devices 21 that has received the group movement notification message uses group affiliation control unit 25 to submit inquiries to position information memory unit 26 to check whether its own unit is a relay device that is the object of movement, and if its own device is a relay device that is the object of movement, begins the process of changing its group affiliation (processing step 36-1). In the example shown in FIG. 1, internal network relay devices 21-*f*, 21-*m*, and 21-*g*, which are the relay devices that are the objects of movement that are affiliated with external network relay device 11-*a*, begin the process of changing group affiliation. The process of changing group affiliation by internal network relay device 21-*f* is shown hereinbelow.

Group affiliation control unit 25 of internal network relay device 21-*f* refers to the plurality of forwarding tables that have been stored in forwarding table memory unit 24, and determines external network relay device 11 having the lowest hop count, other than external network relay device 11-*a* that transmitted the group movement notification message, as external network relay device 11 after the changing of group.

The method of determining the group that is the destination is not limited to a method that uses the hop count, and may include a method in which, for example, ACK request packets (such as ex.ping) are transmitted from internal network relay devices 21 that have received the group movement notification message to other external network relay devices 11 with the exception of external network relay device 11-*a* that transmitted the group movement notification message, and external network relay device 11 that sends the fastest return of the ACK message is determined as external network relay device 11 following group. In this case, external network relay device 11-*b* is selected as the destination of affiliation following group.

Group affiliation control unit 25 of internal network relay device 21-*f* notifies communication control unit 23 to change the forwarding table that is used to the forwarding table for external network relay device 11-*b*.

Group affiliation control unit 25 further transmits a group withdrawal notification message to external network relay device 11-*a* that is the origin, and transmits a group entry notification message to external network relay device 11-*b* that is the destination (processing step 36-2).

External network relay device 11-*a* that has received the group withdrawal notification message issues notification from group control unit 16 such that the internal network relay device that transmitted the group withdrawal notification message is deleted from the group composition information that was stored in logical tree memory unit 17 by logical tree construction unit 18 (processing step 36-3). In this case, internal network relay device 21-*f* is deleted from the group composition information that is stored in external network relay device 11-*a*.

On the other hand, external network relay device 11-*b* that has received the group entry notification message sends notification from group control unit 16 such that the internal network relay device that transmitted the group entry notification message is added to the group composition information that was stored in logical tree memory unit 17 by logical tree construction unit 18 (processing step 36-4). In this case, internal network relay device 21-*f* is added to the group composition information that is stored in external network relay device 11-*b*.

Figure 5:
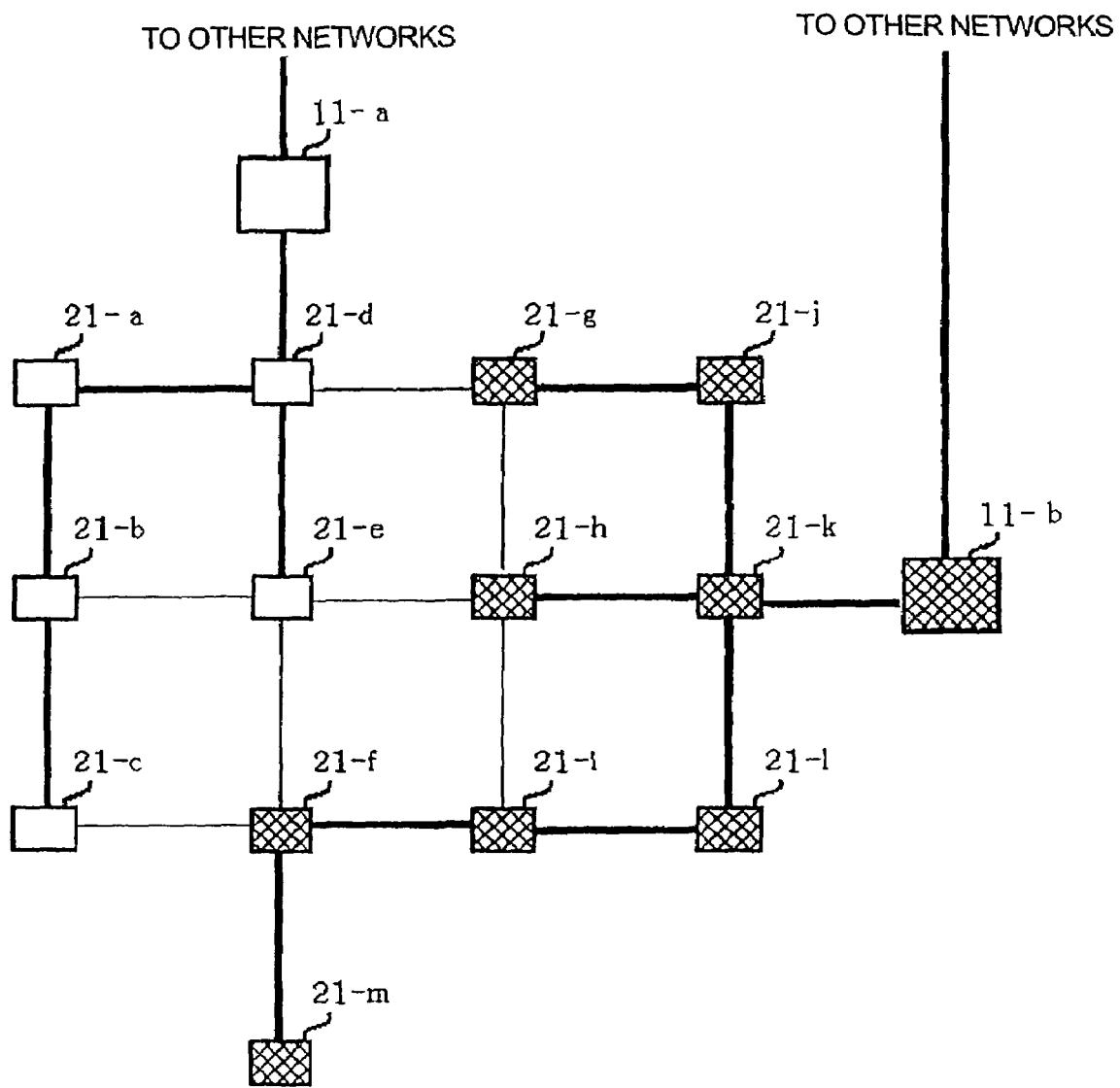
FIG. 5 is a block diagram showing the configuration of the logical tree of each external network relay device after changing groups of relay devices that are the objects of movement.

FIG. 5 shows the composition of each group after the change of internal network relay device (the relay device that is the object of movement) 21-*f*. In the example that is shown in FIG. 5, the thirteen internal network relay devices 21-*a*-*m* form two groups (the group of 21-*a*-*e* and the group of 21-*f*-*m*) as shown by the heavier lines in the figure. The processing of the above-described Step 3-Step 6 is subsequently repeated.

In the foregoing explanation, a case was shown in which a spanning tree that conforms to IEEE 802.1D was used in logical tree construction unit 18, but the present invention is not limited to cases in which spanning trees are used to construct logical trees and may be applied as long as logical trees can be constructed without generating loops within the network.

In addition, a case was described in the foregoing explanation in which internal network relay device 21-*f* changed from the group of external network relay device 11-*a* to the group of external network relay device 11-*b*, but when there are a plurality of relay device that are the objects of movement, these relay devices that are the objects of movement may change groups by the same processes as internal network relay device 21-*f*. Further, internal network relay devices 21 that are to become the objects of movement may be limited by considering the processing load in internal network relay devices 21. More specifically, internal network relay devices (the relay devices that are the objects of movement) 21 having the highest processing load or internal network relay devices (relay devices that are the objects of movement) 21 in which the processing load exceeds a prescribed threshold value that has been set in advance may be taken as the objects of group movement.

WORKING EXAMPLE

The following explanation regards a working example of the present invention.

Figure 6:
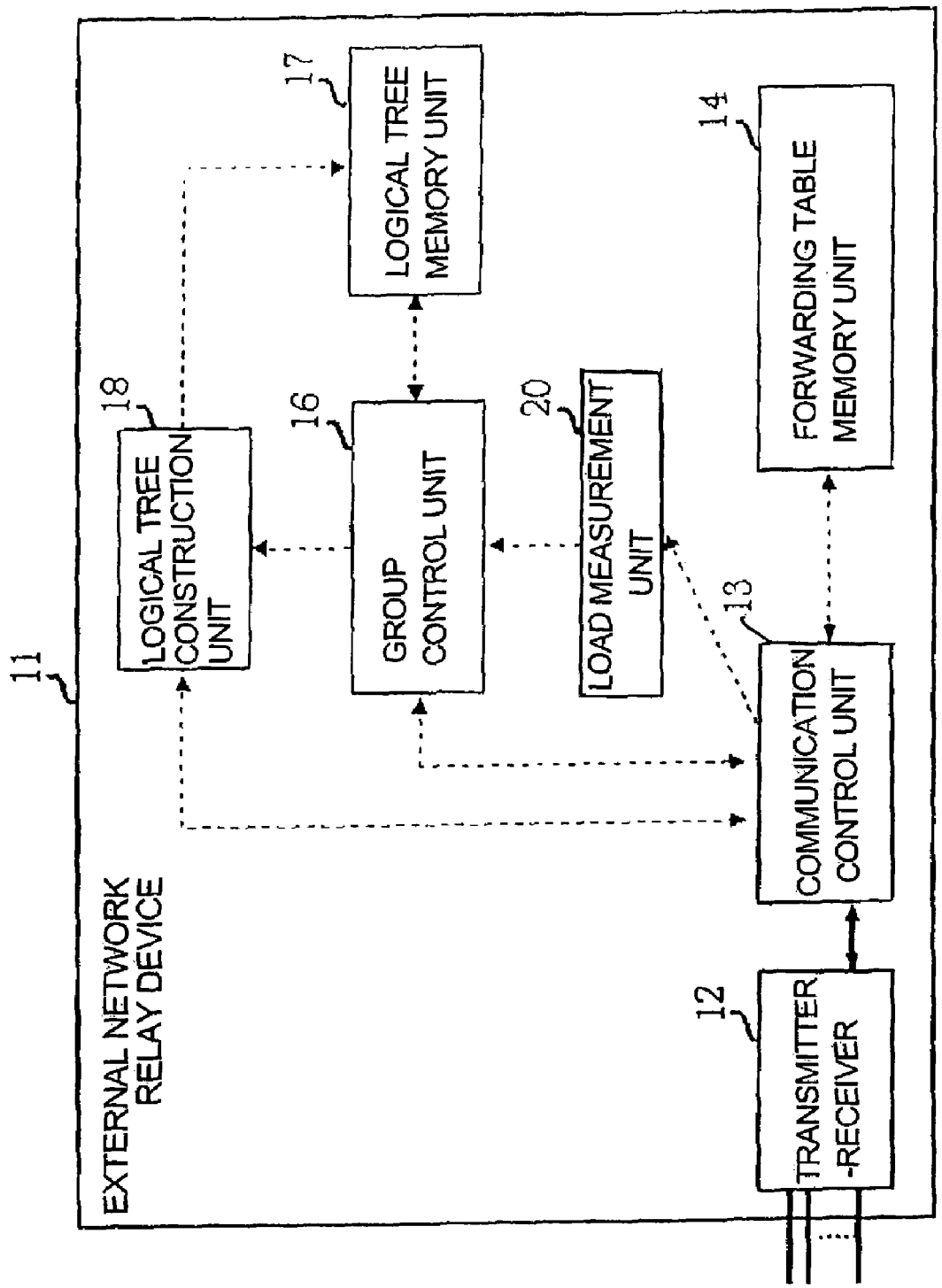
FIG. 6 is a block diagram showing the configuration of a working example of the external network relay device of the present invention.
Figure 7:
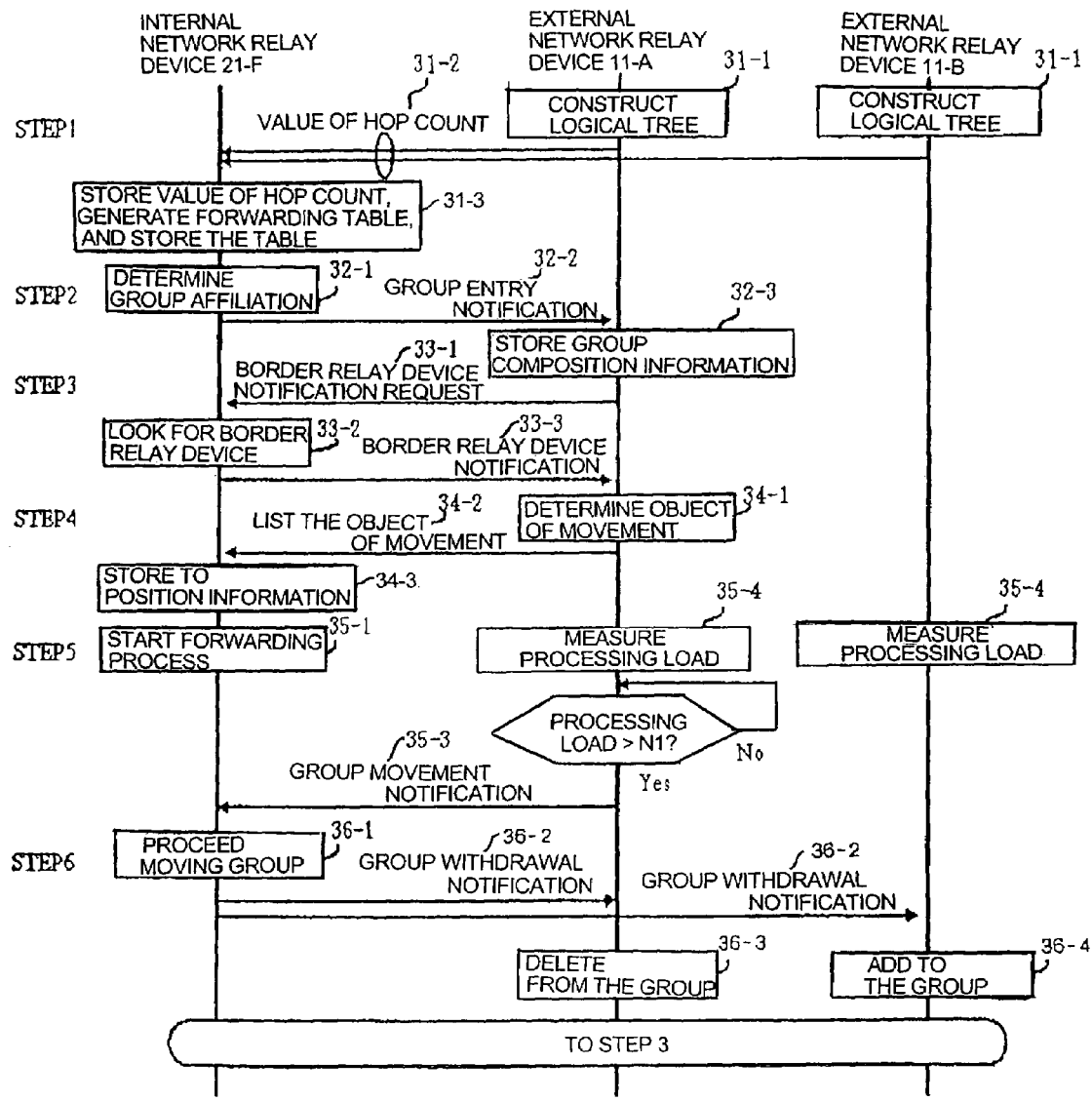
FIG. 7 is a flow chart showing the procedure of an access network system that is provided with the external network relay device that is shown in FIG. 6.

FIG. 6 is a block diagram showing the configuration of a working example of an external network relay device, and FIG. 7 is a flow chart showing the procedures in an access network system that is provided with the external network relay device that is shown in FIG. 6.

External network relay device 11 that is shown in FIG. 6 is an example that uses load measurement unit 20 that measures the processing load of external network relay devices as the group movement parameter measurement unit that was shown in FIG. 2. The configuration of internal network relay device 21 is the same as the above-described embodiment (FIG. 3) and explanation of this device is therefore here omitted.

The following explanation regards the operation of the access network system of the present working example with reference to the figure.

FIG. 7 is a sequence chart showing the procedures of a working example of the access network system of the present invention.

The following explanation regards the operation of the access network system of the present invention for a case in which internal network relay device 21-*f* that is shown in FIG. 1 changes from the group of external network relay device 11-*a* to the group of external network relay device 11-*b*.

In FIG. 7, the processes from Step 1 to Step 4 are the same as the above-described embodiment.

[Step 5] After the completion of the processes from Step 1 to Step 4, internal network relay devices 21 refer to the forwarding tables that were selected in Step 2 by means of communication control unit 23 and begin the process of forwarding frames that are the objects of transmission and reception (processing step 35-1).

On the other hand, external network relay devices 11 begin the measurement of the processing load of external network relay devices 11 by means of load measurement units 20 (processing step 35-2). When the processing load that has been measured by load measurement unit 20 exceeds a prescribed threshold value N1 that has been set in advance, external network relay device 11 transmits group movement notification messages instructing the change of groups to all internal network relay devices 21 that are affiliated with its own group (processing step 35-3).

Step 6 is the same as in the above-described embodiment.

FIG. 5 shows the composition of the logical trees of external network relay devices 11-*a* and 11-*b* after the change of internal network relay device (the relay device that is the object of movement) 21-*f* by means of the processing of the present working example. The processes of the above-described Step 3 to Step 6 are subsequently repeated.

FIG. 7 shows an example in which, when the processing load of external network relay device 11-*a* exceeds prescribed threshold value N1, internal network relay device 21-*f* that is affiliated with the group of external network relay device 11-*a* is changed to the group of external network relay device 11-*b* that has a lighter processing load and the processing load of external network relay device 11-*a* is made lighter.

A case was described in the foregoing explanation in which the group changing process was started in internal network relay devices (relay devices that are the object of movement) 21 when the processing load of external network relay device 11 exceeded a prescribed threshold value N1, but the change of group of internal network relay devices 21 may also begin when, for example, processing load information is exchanged periodically among a plurality of external network relay devices 11 and external network relay device 11 having a lighter processing load than one's own device is detected.

According-to the present invention, an access network system is obtained in which internal network relay devices 21 can be dynamically changed to other groups in accordance with the value of group movement parameters that are determined in advance.

For example, if the processing load of external network relay devices 11 is adopted as a group movement parameter, internal network relay devices 21 in the group of a particular external network relay device 11 can be changed to the group of another external network relay device 11 having a lighter load in accordance with the processing load of external network relay devices 11. The processing load can thus be distributed among a plurality of external network relay devices 11, whereby the amount of traffic of the entire network can be increased. In addition, the lightening of the processing load of external network relay devices 11 before the occurrence of a problem reduces the rate of incidence of problems and thus improves the reliability of the network.

In the present invention, moreover, forwarding tables for each external network relay device 11 are stored in each of internal network relay devices 21, and as a result, change of the group affiliation necessitates only a change of the forwarding tables that are to be used. In addition, external network relay devices 11 need only amend group composition information on change of affiliated internal network relay devices 21. As a result, internal network relay devices 21 can be rapidly changed to other groups.

An extended state of excessive load can thus be avoided in external network relay devices 11, whereby the rate of incidence of problems in external network relay devices 11 is reduced and the reliability of the network is improved.

What is claimed is:

1. An access network system comprising:
   a plurality of external network relay devices, which are relay devices for connecting to other networks; and
   a plurality of internal network relay devices for relaying information that is transmitted and received within the same network and that belong to any of a plurality of groups that are set to correspond to said external network relay devices;
   wherein each said external network relay device comprises:
   a group movement parameter measurement unit for measuring group movement parameters that are used for determining whether the need exists to change the group affiliation of said internal network relay devices; and
   a group control unit for, when measurement results of said group movement parameter measurement unit meet conditions that have been set in advance, transmitting group movement notification messages instructing the change of groups to internal network relay devices of its own group and causing the internal network relay devices to change to other groups;
   wherein:
   said internal network relay devices each comprise a group affiliation control unit for determining that its own device is a border relay device when at least one adjacent internal network relay device or external network relay device belongs to another group, and for notifying the results of this determination to the external network relay device of the group to which said internal network relay device belongs; and
   said external network relay devices each use said group control unit to designate as relay devices that are the objects of movement, which are the objects of movement to other groups, border relay devices of the border relay devices within its own group that lack a border relay device downstream and internal network relay devices that are connected downstream of the border relay devices; and notify each of internal network relay devices within its own group whether these internal network relay devices are said relay devices that are objects of movement.

2. The access network system according to claim 1, wherein said internal network relay devices each comprise:
   a communication control unit for both generating a plurality of forwarding tables for communicating with said external network relay devices and using the forwarding tables that correspond to the group to which said internal network relay device belongs to perform the process of forwarding said information; and
   a forwarding table memory unit for storing each of said forwarding tables.

3. The access network system according to claim 1, wherein said group affiliation control unit determines the group of the external network relay device that has the lowest hop count from the internal network relay device of said group affiliation control unit to be the group to which that device is to belong.

4. The access network system according to claim 1, wherein:
said group affiliation control unit, upon receiving said group movement notification message from the external network relay device of the group to which the internal network relay device of that group affiliation control unit belongs, determines whether that internal network relay device is said relay device that is the object of movement; and
when the internal network relay device of that group affiliation control unit is said relay device that is the object of movement, said internal network relay device changes to the group of another external network relay device.

5. The access network system according to claim 4, wherein said group affiliation control unit determines to change the group of the external network relay device that has the lowest hop count, with the exception of the external network relay device that transmitted said group movement notification message.

6. The access network system according to claim 1, wherein said group movement parameter measurement unit measures the processing load of said external network relay devices.

7. The access network system according to claim 1, wherein said group movement parameter measurement unit measures the frequency of use of resources of said external network relay devices.

8. The access network system according to claim 1, wherein said group movement parameter measurement unit measures the number of frames that undergo the forwarding process within a prescribed time interval in said external network relay devices.

9. A method for moving internal network relay devices for causing said internal network relay devices to change groups of affiliation in an access network system that includes a plurality of external network relay devices, which are relay devices for connecting to other networks, and a plurality of internal network relay devices for relaying information that is transmitted and received within the same network and that belong to any of a plurality of groups that are set to correspond to said external network relay devices; the method comprising:
measuring, by said external network relay devices, group movement parameters that are used to determine whether the need exists to change group affiliation of said internal network relay devices; and
when the results of measuring said group movement parameters meet conditions that have been set in advance, transmitting group movement notification messages instructing the change of group to internal network relay devices within its own group and cause the internal network relay devices to change to other groups; and
determining, by said internal network relay devices, that its own device is a border relay device when at least one adjacent internal network relay device or external network relay device belongs to another group, and notifies the results of this determination to the external network relay device of the group to which it belongs; and
each of said external network relay devices:
designates as relay devices that are the objects of movement, which are the objects of movement to other groups, border relay devices of the border relay devices within its own group that lack a border relay device downstream and internal network relay devices that are connected downstream of said border relay devices; and
notifies each of internal network relay devices within its own group whether these internal network relay devices are said relay devices that are objects of movement.

10. The method of moving internal network relay devices according to claim 9, wherein each of said internal network relay devices:
both generates a plurality of forwarding tables for communicating with said external network relay devices and stores the forwarding tables in respective memory units; and
performs the process of forwarding said information by using the forwarding tables that correspond to the group to which said internal network relay device belongs.

11. The method of moving internal network relay devices according to claim 9, wherein each of said internal network relay devices determines the group of the external network relay device that has the lowest hop count from that internal network relay device to be the group to which that device is to belong.

12. The method of moving internal network relay devices according to claim 9, wherein each of said internal network relay devices:
upon receiving said group movement notification message from the external network relay device of the group to which that internal network relay device belongs, determines whether that internal network relay device is said relay device that is the object of movement; and
when that internal network relay device is said relay device that is the object of movement, said internal network relay device changes to the group of another external network relay device.

13. The method of moving internal network relay devices according to claim 12, wherein each of said internal network relay devices changes to the group of the external network relay device that has the lowest hop count, with the exception of the external network relay device that transmitted said group movement notification message.

14. The method of moving internal network relay devices according to claim 9, wherein each of said external network relay devices measures the processing load of its own device as said group movement parameter.

15. The method of moving internal network relay devices according to claim 9, wherein each of said external network relay devices measures the frequency of use of resources of its own device as said group movement parameter.

16. The method of moving internal network relay devices according to claim 9, wherein each of said external network relay devices measures the number of frames that undergo the forwarding process within a prescribed time interval in its own device as said group movement parameter.

17. The access network system according to claim 1, wherein each group of said plurality of groups is assigned exclusively to a different external network relay device of said plurality of external network relay devices.

18. The access network system according to claim 1, wherein:
said internal network relay devices each comprise said group affiliation control unit for determining which group of said plurality of groups to belong to, establishing an affiliation with said group by selecting a corresponding external network relay device which belongs exclusively to said group, and transmitting a group entry notification message to said corresponding external network relay device belonging to said group for updating group information within said corresponding external network relay device.

19. The access network system according to claim 1, wherein said group control unit of said external network relay device transmits a border relay device notification request message to all of said internal network relay devices which belong to a group assigned exclusively to said external network relay device; and said internal network relay devices each comprise said group affiliation control unit which determines upon receipt of said border relay device notification request message whether its own said internal network relay device is a border relay device that is adjacent to an internal network relay device of another group by sending inquiries regarding group affiliation to each adjacent internal network relay device.

20. The access network system according to claim 19, wherein said group affiliation control unit of said internal network relay device sends a border relay device notification message to said external network relay device assigned to said group to which said internal network relay device belongs to notify said external network relay device that said internal network relay device is a border device of said group.

* * * * *